(12) United States Patent
Lee (10) Patent No.: US 7,162,275 B2
(45) Date of Patent: Jan. 9, 2007

(54) APPARATUS AND METHOD FOR PERFORMING A DIALING OPERATION USING A PHONE BOOK OF A MOBILE COMMUNICATION TERMINAL

(75) Inventor: Byeong-Kuk Lee, Kumi-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 139 days.

(21) Appl. No.: 10/409,212

(22) Filed: Apr. 9, 2003

(65) Prior Publication Data

US 2003/0195018 A1  Oct. 16, 2003

(30) Foreign Application Priority Data

Apr. 13, 2002 (KR) ............................. 2002-20253

(51) Int. Cl.
*H04M 1/38* (2006.01)
(52) U.S. Cl. ............... 455/566; 455/414.1; 455/412.2; 379/355.01; 379/355.04; 379/356.01
(58) Field of Classification Search ............... 455/566, 455/550.1, 415, 414.1, 517; 379/221.05, 379/355.02, 355.01
See application file for complete search history.

(56) References Cited

U.S. PATENT DOCUMENTS 5,933,478 A * 8/1999 Ozaki et al. ............. 379/93.24
6,084,951 A * 7/2000 Smith et al. ............. 379/93.17
6,313,736 B1 * 11/2001 Hymel et al. ............. 340/7.56
6,922,411 B1 * 7/2005 Taylor ........................ 370/401
6,957,397 B1 * 10/2005 Hawkins et al. ............. 715/856

FOREIGN PATENT DOCUMENTS

JP 410200620 * 7/1998

* cited by examiner

*Primary Examiner*—Lester G. Kincaid
*Assistant Examiner*—Dung Lam
(74) *Attorney, Agent, or Firm*—Roylance, Abrams, Berdo & Goodman, L.L.P.

(57) ABSTRACT

An apparatus and method for performing a dialing operation using a phone book of a mobile communication terminal, and an apparatus and method capable of displaying all telephone numbers of persons registered in a phone book when a dial history information is displayed. In an apparatus and method for displaying dial history information configured by at least one of a plurality of calling/called telephone classification icons, personal names corresponding to the calling/called telephone classification icons and a single calling/called telephone number icon corresponding to each personal name, the dial history information is sequentially searched. The apparatus and method further determines whether different telephone numbers corresponding to a personal name searched from the dial history information are registered in a phone book. If the different telephone numbers corresponding to the personal name are registered in the phone book, all registered telephone numbers linked to the single calling/called telephone number icon are displayed.

8 Claims, 6 Drawing Sheets

FIG.1

(PRIOR ART)

| | TOM | ♣ ★ ▪ |
|---|---|---|
| | 011-123-4567 | |
| | JAMES | ♣ ★ ▪ |
| | JANE | ★ ▪ |
| | 016-123-4567 | |
| | 018-123-4567 | |
| | MORGAN | ♣ ▪ |
| | THOMAS | ★ |

☏ CALLING TELEPHONE ICON
☎ CALLED TELEPHONE ICON
★ MOBILE TELEPHONE NUMBER ICON
▪ OFFICE TELEPHONE NUMBER ICON
♣ HOME TELEPHONE NUMBER ICON

APPARATUS AND METHOD FOR PERFORMING A DIALING OPERATION USING A PHONE BOOK OF A MOBILE COMMUNICATION TERMINAL

PRIORITY

This application claims priority to an application entitled "METHOD FOR PERFORMING DIALING OPERATION USING PHONE BOOK OF MOBILE COMMUNICATION TERMINAL", filed in the Korean Industrial Property Office on Apr. 13, 2002 and assigned Serial No. 2002-20253, the contents of which are hereby incorporated by reference.

BACKGROUND OF THE INVENTION

1. Field of the Invention

The present invention relates to an apparatus and method for performing a dialing operation using a phone book of a mobile communication terminal, and more particularly to an apparatus and method capable of displaying all telephone numbers of persons registered in a phone book when dial history information is displayed.

2. Description of the Related Art

Figure 1:
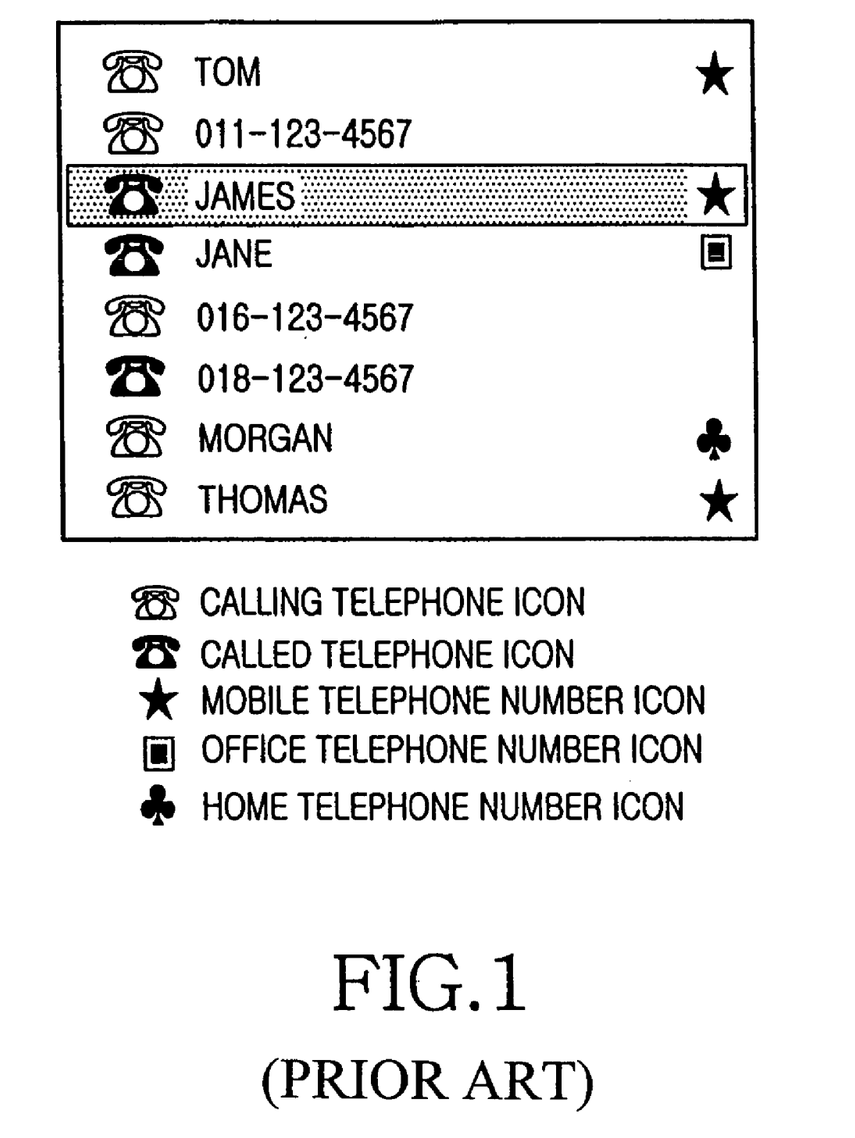
FIG. 1 is a view illustrating conventional dial history information output through a display unit of a mobile communication terminal.

FIG. 1 is a view illustrating conventional dial history information output through a display unit of a mobile communication terminal. When a user of the mobile communication terminal first presses a "SEND" key such that the user searches for dial history information and calls a called party, the display unit displays the dial history information of many persons based on calling/called telephone classification icons and calling/called telephone numbers, or personal names of called parties and telephone number classification icons for example, a mobile telephone number icon, a home telephone number icon, an office telephone number icon, and so on registered in the phone book. When the display unit displays the dial history information of many persons, the display unit also displays an indication block in which a last called telephone number or a last received telephone number is provided so that the user can easily identify the last called or received telephone number.

Thus, the user can perform a dialing operation by selecting a called party for a call using only up and down keys from among the up, down, left and right keys so that the dial history information is displayed on the display unit. However, when the user calls a called party registered in the phone book using the dial history information, there is a problem in that the user must call the called party after searching the phone book for other telephone numbers of the called party for example, a home telephone number, or an office telephone number, etc. or must directly input another telephone number of the called party into the mobile communication terminal to communicate with the called party, when a telephone of the called party whom the user calls is in a call connection state or the user cannot communicate with the called party.

SUMMARY OF THE INVENTION

Therefore, the present invention has been made in view of the above problem, and it is an object of the present invention to provide an apparatus and method capable of displaying all telephone numbers of persons registered in a phone book when dial history information is displayed.

It is another object of the present invention to provide an apparatus and method capable of sequentially selecting all telephone numbers of a called party whom a user desires to call after allowing a user to select the called party, when dial history information is selected.

It is yet another object of the present invention to provide an apparatus and method capable of displaying all telephone numbers of persons registered in a phone book, and sequentially selecting all telephone numbers of the called party after allowing a user to select a called party whom a user desires to call, when dial history information is displayed and selected.

In accordance with an aspect of the present invention, the above and other objects can be substantially accomplished by an apparatus and method for displaying dial history information configured by a plurality of calling/called telephone classification icons, personal names corresponding to the calling/called telephone classification icons and a single calling/called telephone number icon corresponding to each personal name. The apparatus and method perform the operations of sequentially searching for the dial history information; determining whether different telephone numbers corresponding to a personal name searched from the dial history information are registered in a phone book; and displaying all registered telephone numbers linked to the single calling/called telephone number icon if the different telephone numbers corresponding to the personal name are registered in the phone book.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Several embodiments of the present invention will be described in detail with reference to the accompanying drawings. In the drawings, the same or similar elements are denoted by the same reference numerals even though they are depicted in different drawings. Also, a detailed description of known functions and configurations has been omitted for conciseness.

Figure 2:
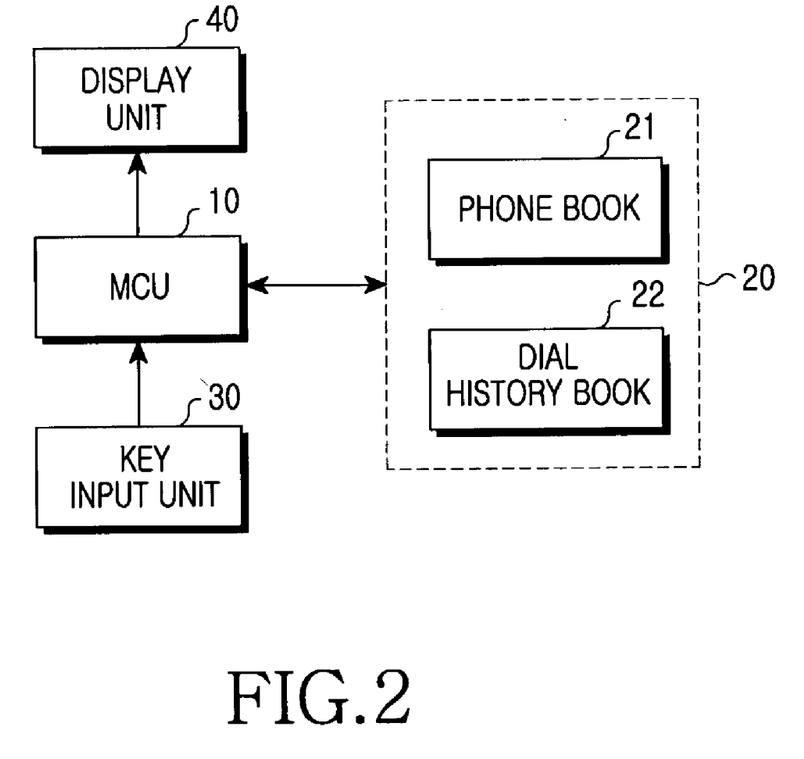
FIG. 2 is a block diagram illustrating an example of a mobile communication terminal for performing a dialing operation using a phone book in accordance with an embodiment of the present invention.
Figure 3:
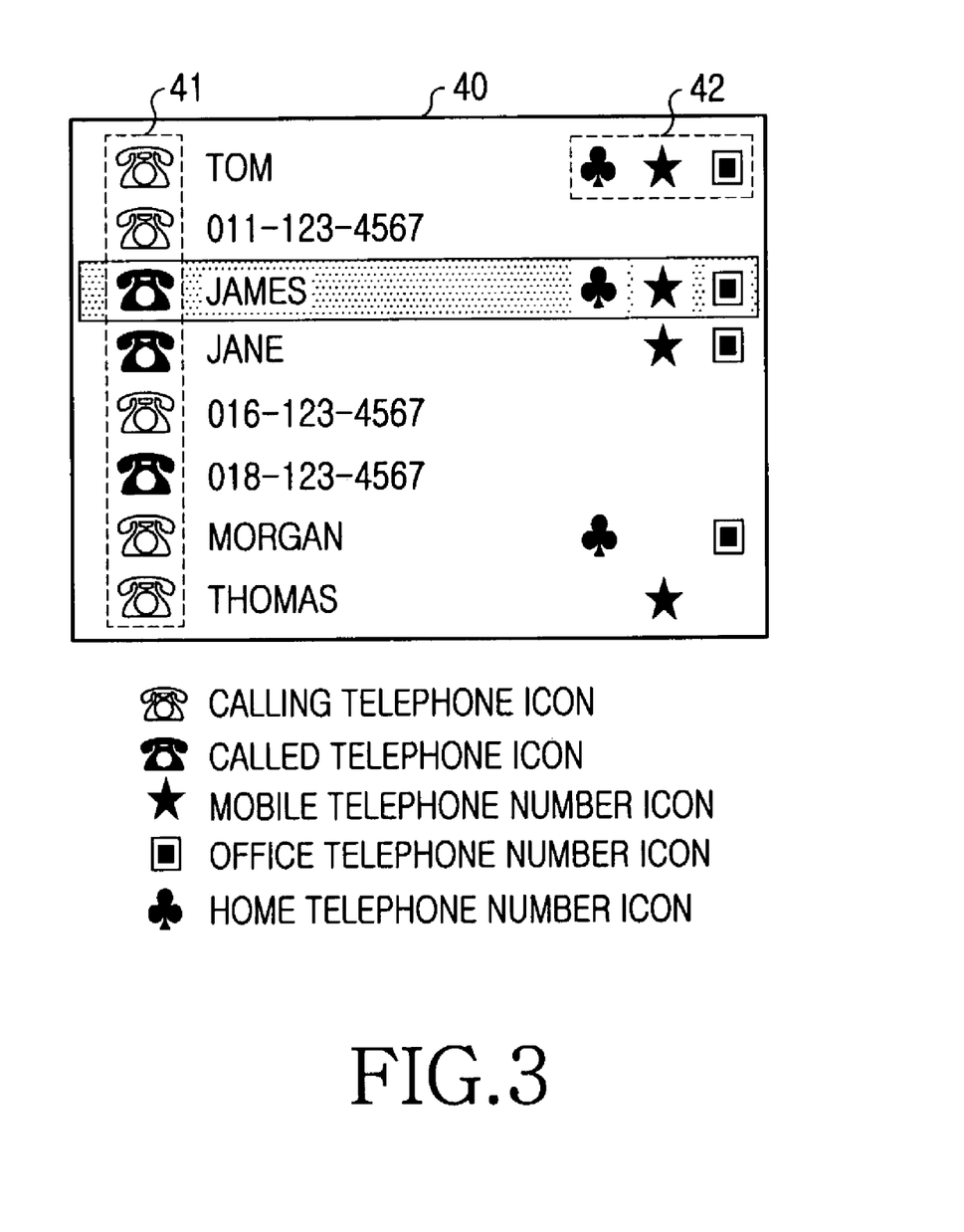
FIG. 3 is a view illustrating exemplary, dial history information displayed on a display unit shown in FIG. 2 in accordance with an embodiment of the present invention.

FIG. 2 is a block diagram illustrating an example of a mobile communication terminal for performing a dialing operation using a phone book in accordance with an embodiment of the present invention; and FIG. 3 is a view illustrating exemplary dial history information displayed on a display unit shown in FIG. 2 in accordance with an embodiment of the present invention.

As shown in FIG. 2, the mobile communication terminal includes a Memory Control Unit (MCU) 10, a memory 20, a key input unit 30 and a display unit 40.

The memory 20 includes a phone book 21 and a dial history book 22. In the phone book 21, a plurality of telephone numbers e.g., mobile telephone numbers, home telephone numbers, office telephone numbers, and the like, frequently called by a user are designated on the basis of a unit of a group corresponding to each personal name. The telephone numbers based on the unit of the group are sequentially registered in the phone book 21 according to the MCU 10 detecting a user's command input through the key input unit 30. All calling and called telephone numbers are registered in the dial history book 22 according to the MCU 10.

The key input unit 30 is conventionally implemented by a keypad. The key input unit 30 includes a key for registering the telephone numbers on an individual or group basis in the phone book 21 of the memory 20, a key for searching for a telephone number registered in the phone book 21 and displaying the searched telephone number on the display unit 40; and a "SEND" key for searching the dial history book 22 and displaying the searched dial history book 22 on the display unit 40.

In response to the MCU 10 detecting the user's display command input through the key input unit 30, the display unit 40 displays telephone number registration information based on the unit of the group, wherein the group corresponds to one called party.

When the user presses the "SEND" key arranged on the key input unit 30, the display unit 40 displays all calling and called telephone number registration information of the dial history book 22 extracted from the memory 20 according to the MCU 10.

As shown in FIG. 3, the registration information of the dial history book 22 displayed by the display unit 40 includes calling/called (also referred to as received/dialed) telephone classification icons 41, personal names corresponding to the calling/called telephone classification icons 41 and telephone number classification icons 42 based on a unit of a group corresponding to each personal name. The calling/called telephone classification icons 41, the personal names and the telephone number classification icons 42 are sequentially arranged line by line. The telephone number classification icons 42 based on the unit of the group are preferably classified into a mobile telephone number icon, a home telephone number icon, an office telephone number icon, or any other suitable icon and displayed such that the user can easily identify a plurality of telephone numbers corresponding to a called party. A calling or called telephone number not registered in the phone book 21 is displayed on the display unit 40 in numeric form.

The MCU 10 controls the phone book 21 such that a personal name of a called party and telephone numbers based on the unit of the group corresponding to the personal name input by the user through the key input unit 30 can be sequentially registered in the phone book 21. Moreover, the MCU 10 controls the display unit 40 such that the personal name of the called party and the telephone numbers based on the unit of the group which corresponds to the personal name registered in the phone book 21 can be appropriately displayed on the display unit 40.

The MCU 10 controls the dial history book 22 such that all calling and called telephone numbers can be sequentially registered. Moreover, the MCU 10 controls the display unit 40 such that information sequentially registered in the dial history book 22 can be displayed on the display unit 40 in response to the user's command.

Figure 4A:
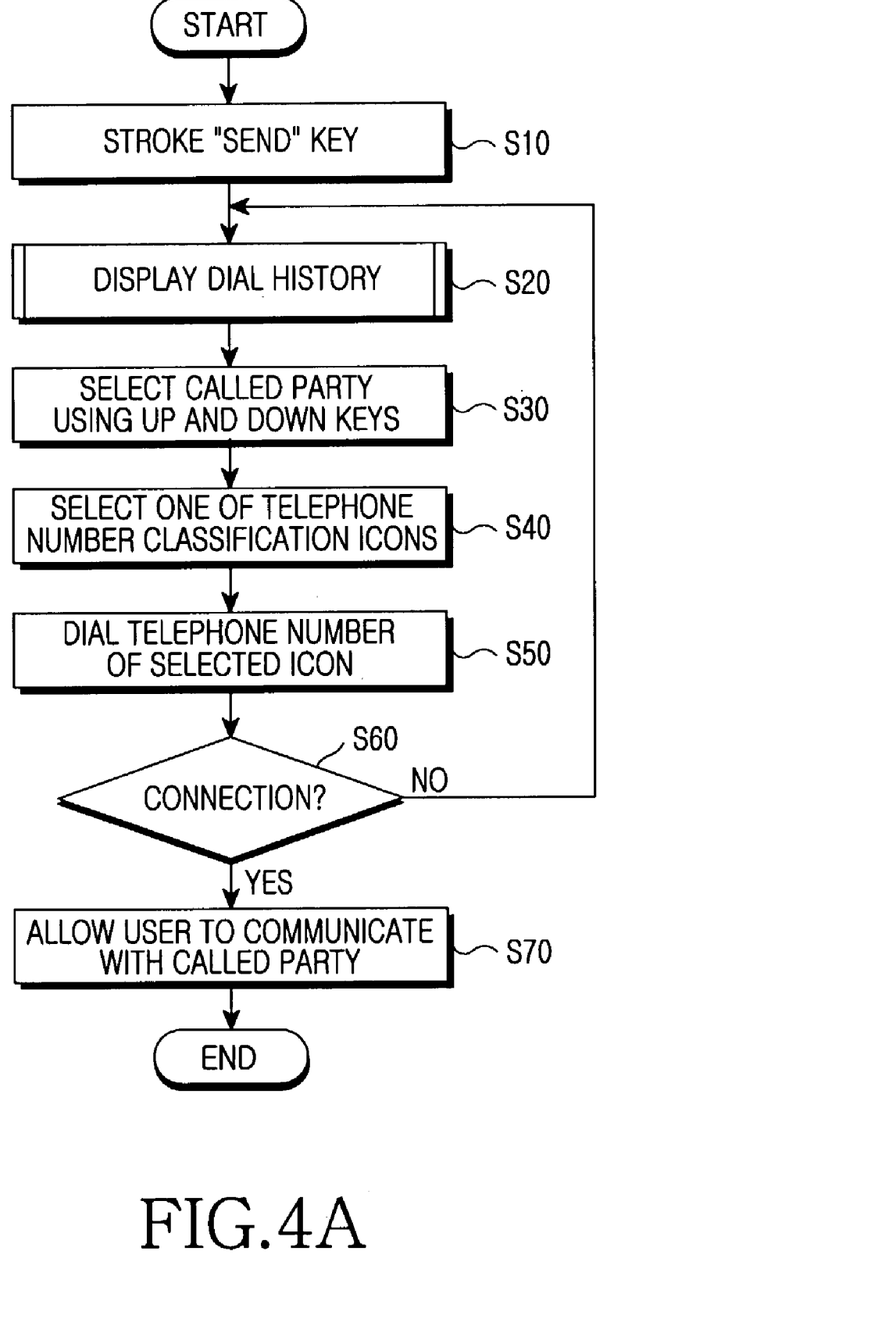
FIG. 4A is a flow chart illustrating an example of steps for performing a dialing operation using the phone book of the mobile communication terminal in accordance with an embodiment of the present invention.
Figure 4B:
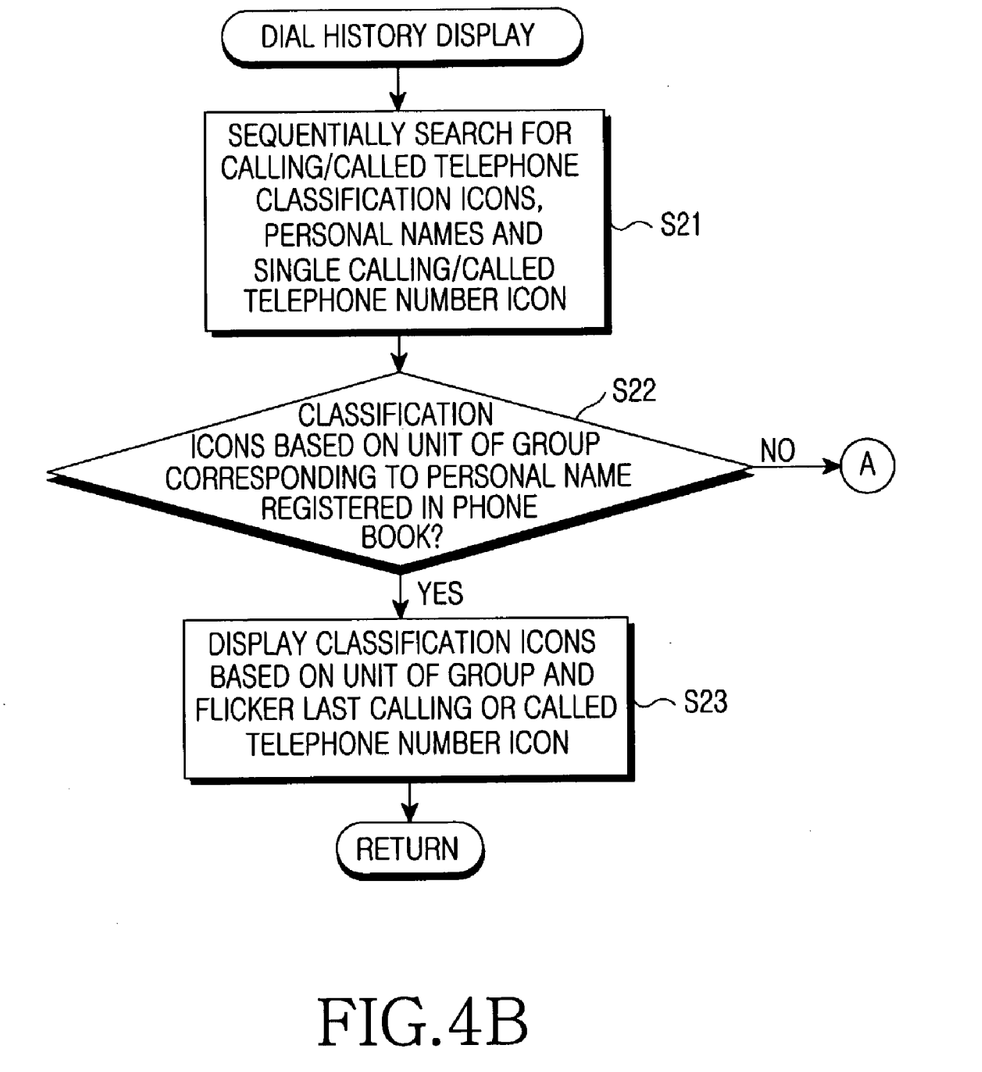
FIG. 4B is a flow chart illustrating an example of steps for displaying the dial history information shown in FIG. 4A in accordance with an embodiment of the present invention.
Figure 4C:
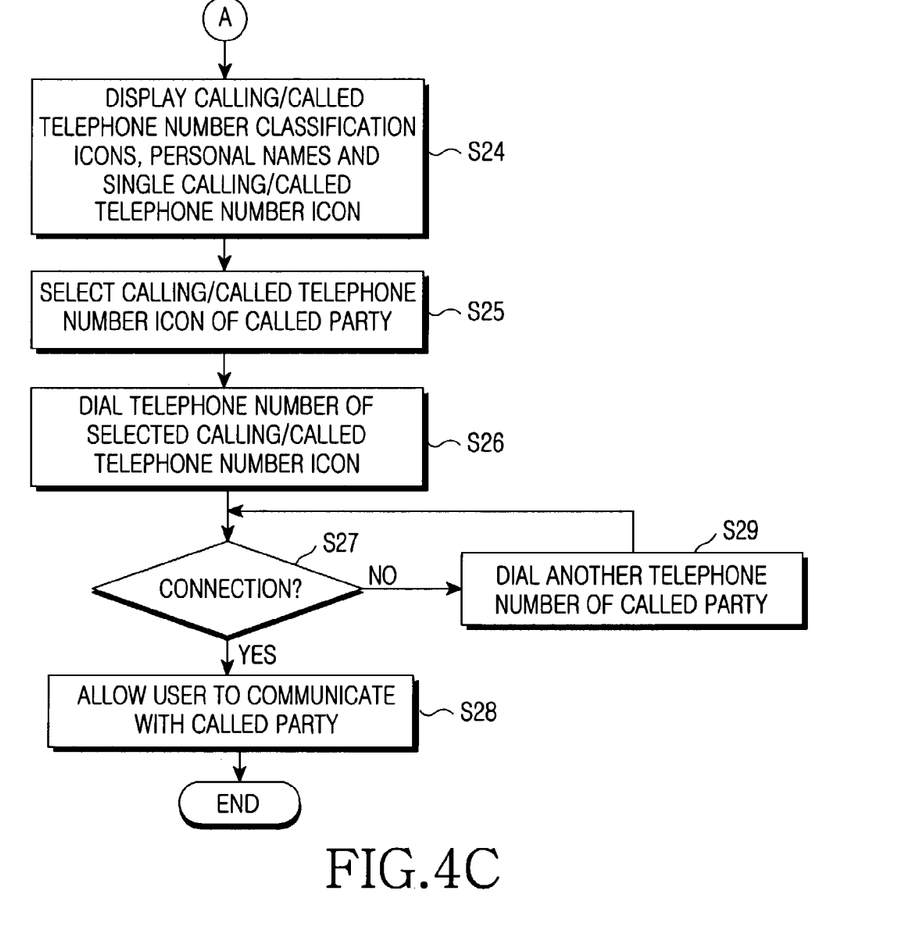
FIG. 4C is a flow chart illustrating an example of steps for providing telephone number classification icons based on a unit of a group corresponding to a personal name not registered in the phone book in accordance with an embodiment of the present invention.

FIG. 4A is a flow chart illustrating an example of steps for performing a dialing operation using the phone book of the mobile communication terminal in accordance with an embodiment of the present invention; FIG. 4B is a flow chart illustrating an example of steps for displaying dial history information shown in FIG. 4A in accordance with an embodiment of the present invention; and FIG. 4C is a flow chart illustrating an example of steps for providing telephone number classification icons based on a unit of a group corresponding to a personal name not registered in the phone book in accordance with an embodiment of the present invention.

As shown in FIG. 4A, in step S10, if the user presses a "SEND" key arranged on the key input unit 30 in a call standby state, the MCU 10 detects the input of the "SEND" key.

In step S20, the MCU 10 detecting the input of the "SEND" key provides a control operation such that dial history information registered in the dial history book 22 of the memory 20 can be displayed on the display unit 40.

As shown in FIG. 4B, a procedure of displaying the dial history information on the display unit 40 during step S20 includes steps S21, S22 and S23. In step S21, the MCU 10 sequentially searches for registration information contained in the dial history book 22 of the memory 20, that is, a plurality of calling/called telephone classification icons 41, personal names corresponding to the calling/called telephone classification icons 41, and a single icon calling/called telephone number corresponding to each personal name. In step S22, it is determined whether telephone number classification icons 42 based on a unit of a group corresponding to a personal name registered in the dial history book 22 are registered in the phone book 21. If the telephone number classification icons 42 based on the unit of the group corresponding to the personal name registered in the dial history book 22 are registered in the phone book 21, the telephone number classification icons 42 are linked to the single calling/called telephone number icon registered in the dial history book 22. Thus, the calling/called telephone classification icons 41, the personal names corresponding to the calling/called telephone classification icons 41 and the telephone number classification icons 42 based on the unit of the group corresponding to each personal name are displayed on the display unit 40 in step S23. At this time, the last calling or called telephone number is flickered on the display unit 40.

After it is determined whether the telephone number classification icons 42 based on the unit of the group corresponding to the personal name registered in the dial history book 22 are registered in the phone book 21 during step S22, steps S24, S25, S26, S27, S28 and S29 as shown in FIG. 4C are performed, if the telephone number classification icons 42 based on the unit of the group corresponding to the personal name are not registered in the phone book 21. In step S24, the registration information of the dial history book 22 sequentially searched for according to the MCU 10 during step S21, that is the plurality of calling/called telephone classification icons 41, the personal names corresponding to the calling/called telephone classification icons 41, and the single calling/called telephone number icon corresponding to the personal name, is displayed on the display unit 40. In step S25, the user selects the single calling/called telephone number icon corresponding to the personal name of a called party whom the user calls by manipulating up and down keys of arrow keys arranged on the key input unit 30. If the user re-presses the "SEND" key arranged on the key input unit 30 in a state that a cursor is located on the icon selected by the user, the mobile communication terminal dials a telephone number corresponding to the icon at the above step S26. In step S27, it is determined whether the mobile communication terminal is connected to a called telephone of the dialed telephone number. If the mobile communication terminal of the calling party is connected to the called telephone of the dialed telephone number, the user communicates with the called party in step S28.

On the other hand, if the mobile communication terminal is not connected to the called telephone of the dialed telephone number, the user can forcibly terminate a call connection state. If the user selects another telephone number icon of the called party registered in the phone book 21, the mobile communication terminal dials another telephone number corresponding to another icon at the above step S29.

Referring now to FIG. 4A, in step S30, if the user selects a called party by manipulating the up and down keys of the arrow keys arranged on the key input unit 30 using the dial history information displayed on the display unit 40 controlled by the MCU 10, the MCU 10 detects that the user has selected the called party.

In step S40, if the user selects one of the telephone number classification icons 42 based on the unit of the group corresponding to the called party after selecting the called party by manipulating left and right keys of the arrow keys, the MCU 10 detects that the user has selected the telephone number classification icon 42.

In step S50, if the user re-enters the "SEND" key arranged on the key input unit 30 in a state that the cursor is located on the icon selected by the user, the MCU 10 detects that the user has re-entered the "SEND" key, and then dials a telephone number corresponding to the icon.

In step S60, it is determined whether the mobile communication terminal of the calling party is connected to a called telephone corresponding to the dialed telephone number. If the mobile communication terminal is connected to the called telephone corresponding to the dialed telephone number, the user can communicate with the called party in step S70.

On the other hand, if the mobile communication terminal is not connected to the called telephone corresponding to the dialed telephone number in step S60, the user can forcibly terminate a call connection state. The MCU 10 controls the display unit 40 such that dial history information can be displayed on the display unit 40 in step S20. After the called party selected by the user has been re-selected in step S30, the remaining icons other than the icon selected in step S40 are sequentially selected and telephone numbers of the remaining icons are sequentially dialed.

Although the several embodiments of the present invention have been disclosed for illustrative purposes, those skilled in the art will appreciate that various modifications, additions and substitutions are possible, without departing from the scope of the invention. Accordingly, the present invention is not limited to the above-described embodiments, but the present invention is defined by the claims, which follow, along with their full scope of equivalents.

What is claimed is:

1. A method for displaying dial history information comprising a plurality of received/dialed entries including either a received/dialed telephone classification icon, a personal name, and telephone number classification icons corresponding to the personal name, or a received/dialed telephone classification icon and a telephone number, the method comprising the steps of:
   sequentially searching for the dial history information from a memory comprising phone book information and dial history book information;
   determining whether different telephone numbers corresponding to a personal name searched from the dial history information are registered in the phone book information;
   linking all registered telephone number classification icons corresponding to the personal name to the dial history information;
   displaying a personal name and its respective received/dialed telephone classification icon along with all its corresponding telephone number classification icons registered in the phone book information; and
   displaying a telephone number and its respective received/dialed telephone classification icon when the telephone number is not registered in the phone book information, thereby allowing a user to select one of the telephone numbers corresponding to each received/dialed entry.

2. The method as set forth in claim 1, wherein all telephone numbers registered in the phone book are each linked to a respective telephone number classification icon and displayed, and at least one of a last received or dialed telephone number classification icon is flickered.

3. A method for performing a dialing operation from dial history information of a mobile communication terminal, comprising the steps of:
   selecting a personal name of a called party based on dial history information, the dial history information comprising at least one of a plurality of entries, wherein each entry consists of a received/dialed telephone classification icon, a personal name, and all telephone number classification icons corresponding to the personal name;
   selecting one telephone number classification icon among all the telephone number classifications icons corresponding to a selected personal name, wherein the telephone number classification icon represents a telephone number which is obtained from both phone book information and the dial history book information;
   dialing a telephone number corresponding to the telephone number classification icon selected; and
   connecting the mobile communication terminal to a called telephone of the dialed telephone number such that communication with a called party of the called telephone is established.

4. The method as set forth in claim 3, further comprising:
   sequentially selecting other telephone number classification icons from the telephone number classification icons; and
   sequentially dialing telephone numbers of the selected telephone number icons, if the mobile communication terminal is not connected to the called telephone of the dialed telephone number.

5. An apparatus for displaying dial history information comprising a plurality of received/dialed entries, wherein each entry includes either a received/dialed telephone classification icon, a personal name, and telephone number classification icons corresponding to the personal name, or a received/dialed telephone classification icon and a telephone number, the apparatus comprising:

a controller configured to perform the following operations:

sequentially search for the dial history information from a memory comprising phone book information and dial history book information;

determine whether different telephone numbers corresponding to a personal name searched from the dial history information are registered in the phone book information; and         link all registered number classification icons corresponding to the personal name to the dial history information; and     a display configured to display a personal name and a respective received/dialed telephone classification icon along with all its corresponding telephone number classification icons registered in the phone book information, and display a telephone number and a respective received/dialed telephone classification icon when the telephone number is not registered in the phone book information.

6. The apparatus as set forth in claim 5, wherein all telephone numbers registered in the phone book are each linked to a respective telephone number classification icon and displayed and at least one of a last received or dialed telephone number classification icon is flickered.

7. An apparatus for performing a dialing operation from dial history information of a mobile communication terminal, the apparatus comprising:

a controller configured to perform the following operations,         select a personal name of a called party based on dial history information, the dial history information comprising at least one of a plurality of entries, wherein each entry includes a received/dialed telephone classification icon, a personal name, and all telephone number classification icons corresponding to the personal name;

select one telephone number classification icon among all the telephone number classification icons corresponding to a selected personal name, wherein the telephone number classification icon represents a telephone number which is obtained from both phone book information and the dial history book information;

dial a telephone number corresponding to the telephone number classification icon selected; and     connect the mobile communication terminal to a called telephone of the dialed telephone number such that communication with a called party of the called telephone is established.

8. The apparatus as set forth in claim 7, wherein the controller is further adapted to:

sequentially select other telephone number classification icons from the telephone number classification icons; and     sequentially dial telephone numbers of the selected telephone number icons, if the mobile communication terminal is not connected to the called telephone of the dialed telephone number.

* * * * *